Oct. 2, 1951        D. F. FROEBE        2,569,562

PUMP AND MOTOR HYDRAULIC TRANSMISSION

Filed June 3, 1946        5 Sheets-Sheet 1

Inventor,
Douglas F. Froebe,

By Joseph C. Gardner Atty.

Oct. 2, 1951      D. F. FROEBE      2,569,562
PUMP AND MOTOR HYDRAULIC TRANSMISSION
Filed June 3, 1946      5 Sheets-Sheet 2
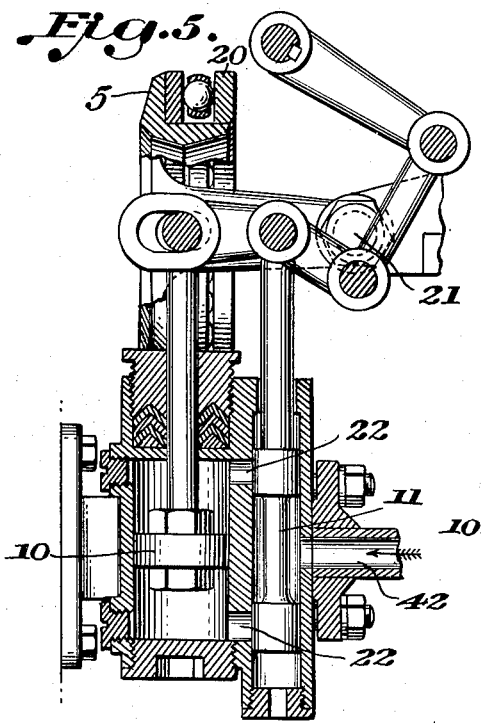
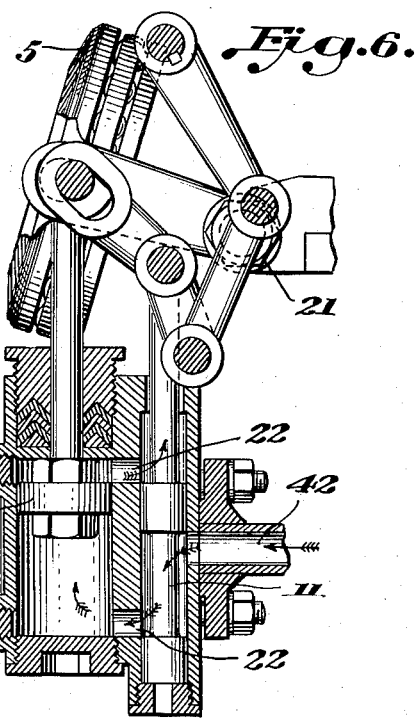
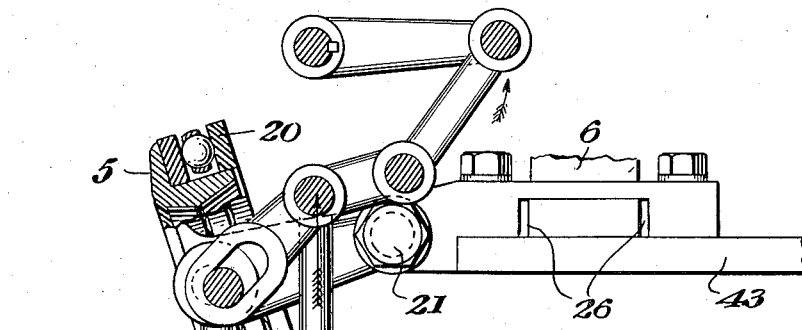
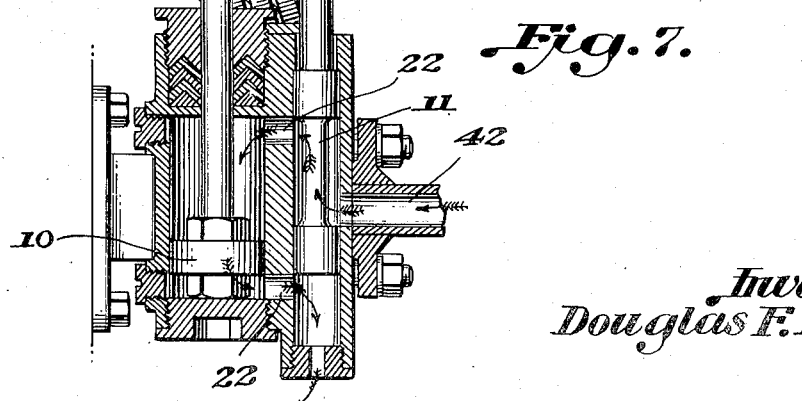
Inventor,
Douglas F. Froebe,
By Joseph B. Gardner Atty.

Oct. 2, 1951  D. F. FROEBE  2,569,562
PUMP AND MOTOR HYDRAULIC TRANSMISSION
Filed June 3, 1946  5 Sheets-Sheet 3

Inventor;
Douglas F. Froebe,
By Joseph B. Gardner Atty.

Oct. 2, 1951  D. F. FROEBE  2,569,562
PUMP AND MOTOR HYDRAULIC TRANSMISSION
Filed June 3, 1946  5 Sheets-Sheet 4
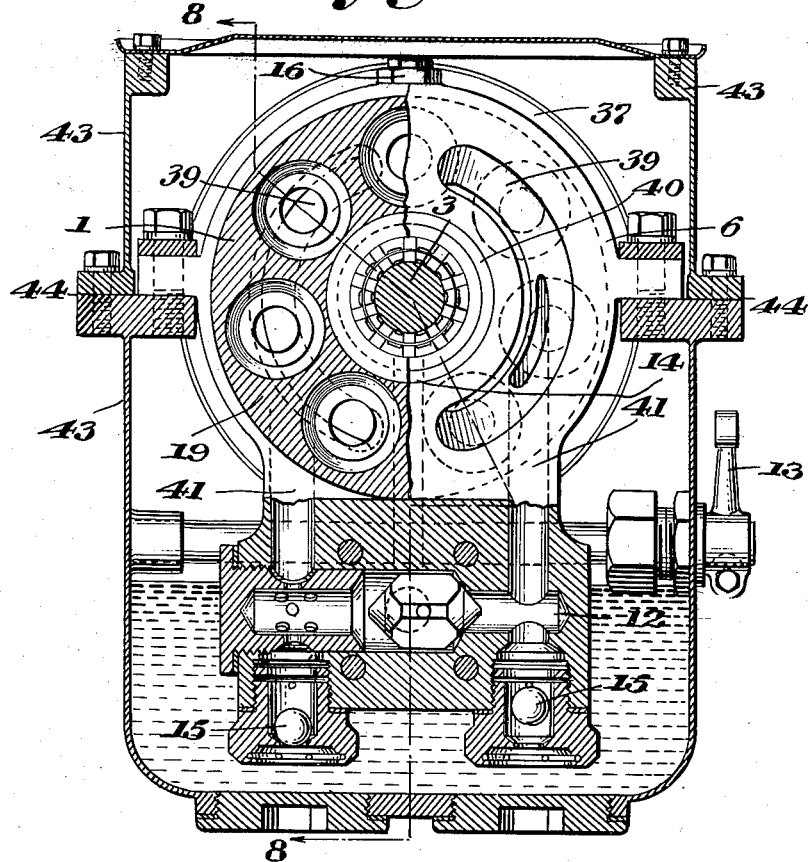
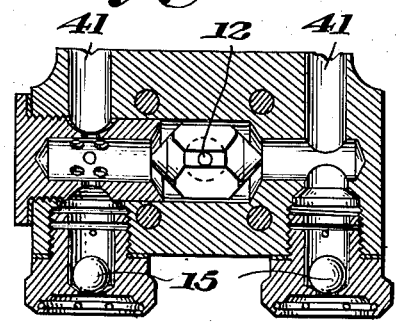
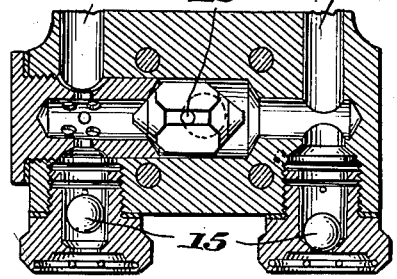
Inventor,
Douglas F. Froebe,
By Joseph B. Gardner Atty.

Oct. 2, 1951     D. F. FROEBE     2,569,562
PUMP AND MOTOR HYDRAULIC TRANSMISSION
Filed June 3, 1946     5 Sheets-Sheet 5

Inventor,
Douglas F. Froebe,
By Joseph B. Gardner Atty.

Patented Oct. 2, 1951

2,569,562

UNITED STATES PATENT OFFICE 2,569,562

PUMP AND MOTOR HYDRAULIC TRANSMISSION

Douglas Fitch Froebe, Oakland, Calif.

Application June 3, 1946, Serial No. 674,022

3 Claims. (Cl. 60—53)

1

This invention relates to a variable speed transmission of the pump and motor hydraulic type, embodying high efficiency and performance characteristics. In unity ratio the hydraulic coupling fluid is static, transmitting direct drive without transfer from pump to motor. Low ratio settings are accompanied by a corresponding decrease in hydraulic pressure until the latter is zero in stop position wherein no torque is transmitted. In stop position the hydraulic fluid is in full free flow, and the transmission may be used as a brake whether the engine is turning or not. Reverse drive of the transmission has a variable speed ratio with a range between the shafts from unity to infinity. Overdrive has a variable range to approximately double the input speed. There is also a free wheeling position wherein both shafts are free.

The prime requisite of a practical hydraulic transmission is that the power load be always divided equally between the pump unit and the motor unit. In the previously-proposed hydraulic transmissions the load of power transfer has been borne by one pump unit and subsequently absorbed by one motor unit, which produces much higher hydraulic pressures in unit areas and makes heavier construction necessary.

The coaxial piston pump and motor type of design is used for maximum hydraulic efficiency, which allows for the shortest possible distance of travel of the hydraulic fluid between pump unit and motor unit and also reduces the heat of friction which the fluid would absorb in flowing through long or tortuous passages.

An object of the invention is to provide a speed change device of the character described in which selection may be made between reverse, normal forward, or overdrive torque transmission ratios.

Another object of the invention is to provide, in speed change apparatus of the type referred to, novel automatically operating safety means which functions to relieve excess hydraulic pressures in the apparatus should the latter accidentally occur.

A further object of the invention is to provide, in mechanism of the character above described, a pump driving swash plate capable of being selectively operatively positioned by manually or power operated means.

Still another object of the invention is to provide simple means for effectively counterbalancing an eccentrically-positioned swash plate in speed change mechanism of the type referred to.

Yet another object of the invention is to provide, in apparatus of the class described, a novel

2 and effective fluid flow reversing valve mechanism.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to the drawings:

Figure 5 is an enlarged scale vertical sectional view of the power control mechanism, and its associated apparatus, for variably positioning the pumping unit swash plate. The positions of the swash plate is equivalent to that shown in Figure 3.

Figure 6 is a view similar to Figure 5 showing the swash plate positioned correspondingly to its position illustrated in Figure 1.

Figure 7 is a view similar to Figure 5 showing the swash plate located as illustrated in Figure 4.

Figure 9 is a vertical sectional view taken in the plane indicated by the line 9—9 of Figure 8.

Figure 10 is a vertical sectional view, of a portion of the structure of Figure 9, showing the flow-control valve in neutral position.

Figure 11 is a view similar to Figure 10, showing the flow-control valve in another operative position.

Figure 8:
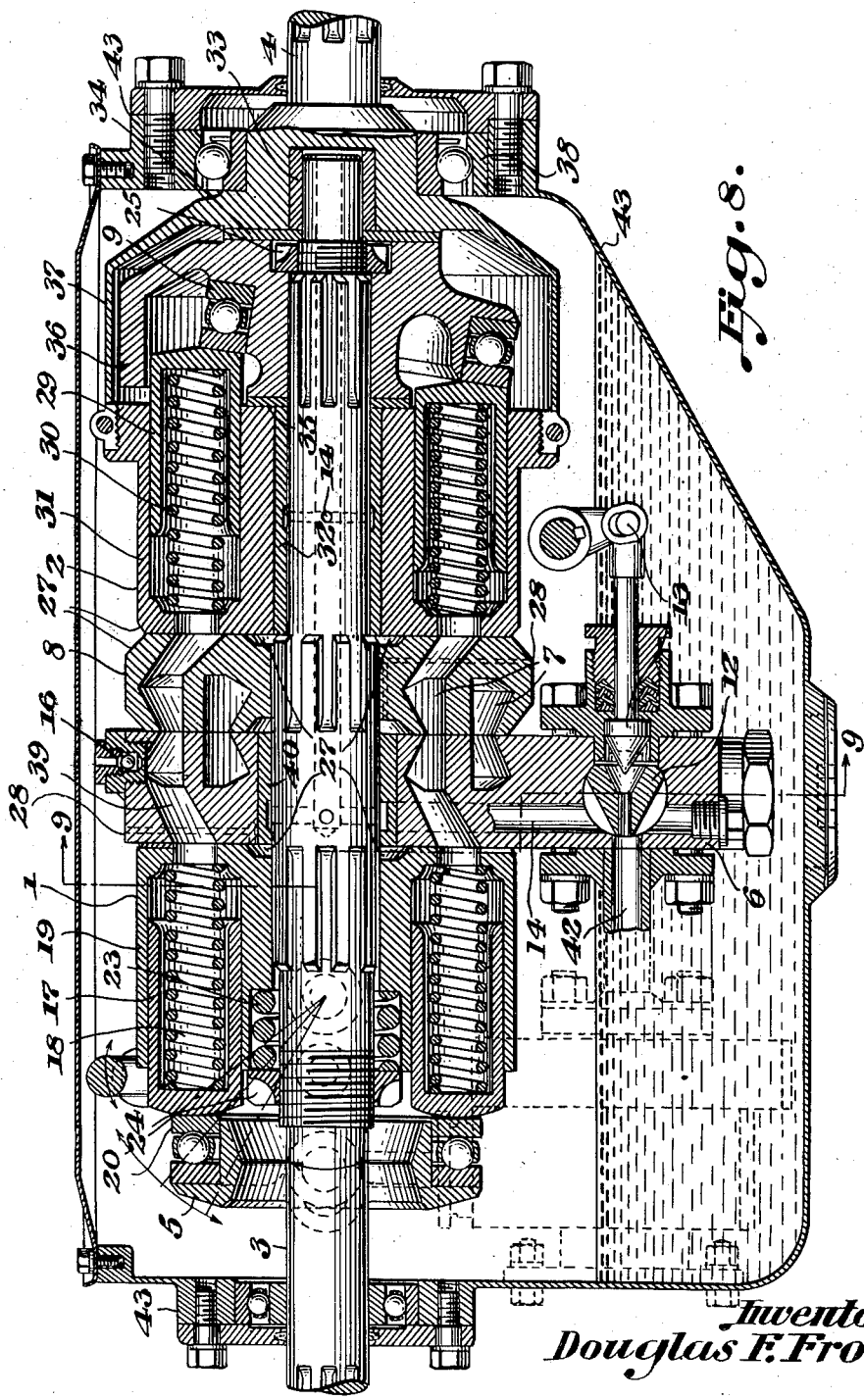
Figure 8 is an enlarged scale vertical sectional view taken longitudinally of the variable speed transmission of my invention, namely, in the plane indicated by the line 8—8 of Figure 9.

The transmission consists broadly of a variable displacement hydraulic pump unit generally indicated by the numeral 1, and a constant capacity hydraulic motor unit generally indicated by the numeral 2, as best shown in Figure 8. A pump cylinder block 19 is splined or keyed to and rotatable with a power input shaft 3, the strokes of the spring-resisted pistons 17 operating in the axially horizontally and peripherally-spaced pump cylinders of the block 19 being selectively variable by the controllable annular pump swash plate 20 which is pivoted by hinge pins 21 to a stationary outer casing 43 and operable to swing in an arcuate path intersecting the axis of the power input shaft 3 by the power control unit shown in Figures 5, 6, and 7 which will be presently described in detail. A valve head 6 having relatively spaced, transaxially disposed and parallel faces is also fixed against rotation to the outer casing 43, and has therein intake and discharge parts having continuing ducts 39 which connect with arcuate collector channels 7 whose center of curvature coincides with the axis of the power input shaft 3 and which are open along their length at the face of the valve head opposite the latter against which the pump cylinder block 19 bears. The motor unit comprises a cylinder block 31, similar in form to the pump block 19, which is connected to rotate with a driven shaft 4 through a bell casing 37. The strokes of the motor pistons 29 slidable in the bores of the cylinder block 31, which are similar in number to the pump cylinders, are operated by a fixed-angle swash plate 9 which is keyed or splined to the power input shaft 3 to rotate in unison therewith. A circular valve head 8 is also keyed or splined to the power input shaft 3 and is provided with discharge and intake ports opening into arcuate collector channels 7 formed in the valve head so that the respective cylinders of the pump and motor units are in communication with each other. The valve head 8 is thus synchronously rotatable with the swash plate 9, so that the intake and discharge parts of the pump unit cylinders and of the valve head 8 are timed for intake and discharge flows with the intake and discharge strokes of the motor pistons 29, the extent of the latter being invariably fixed by the swash plate 9 which is somewhat smaller than the maximum angular range through which the pump unit swash plate 20 may be swung.

Figure 2:
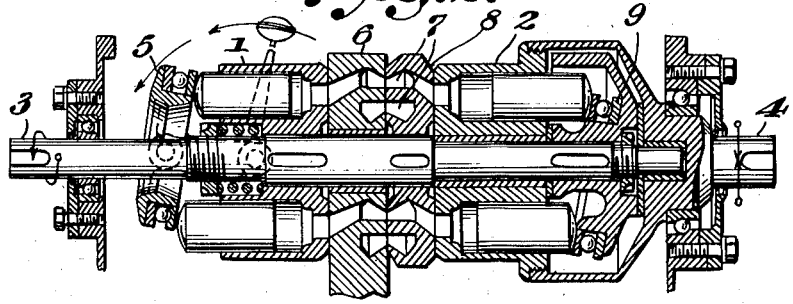
Figure 2 is a view similar to Figure 1 showing the positions of the parts in providing for the transmission of zero torque between the shafts.

It will be understood from the foregoing and by reference to Figure 2 that when the pump unit swash plate 20 occupies a position of planar angularity with respect to the axis of the drive shaft 3, as shown, which coincides with the corresponding angularity of the motor unit swash plate 9, rotation of the pump unit by the drive shaft will cause the pistons 17 to be reciprocated through successive strokes identical to the strokes through which the motor pistons 29 are moved by the swash plate 9. This causes a free reciprocation of the liquid between the pump and motor cylinders with the result that no rotative force will be transmitted to the power output shaft 4 from the revolved drive shaft 3. Referring to Figure 9 it will be seen that the arcuate collector channels 7 are of such a length that they each span three of the group of seven cylinders of the pump and motor units, separate channels serving as suction and discharge chambers for the liquid during operation of the mechanism, the arrangement being such that, in the case of the pump unit for instance, while at least three of the cylinders are discharging liquid into one of the chambers during their pressure strokes, another group of three cylinders will be drawing charging liquid from the other chamber which, during the subsequent pressure stroke of the pistons of the latter cylinders will be forcibly ejected into the discharge chamber as the pump unit revolves relative to the swash plate 20. The same condition, of course, obtains with relation to the motor unit as the latter is revolved relative to the arcuate collector channels associated with it. In furtherance of this explanation it will be seen that the fixed swash plate 9 has an operating face contacting the ends of the motor unit pistons 29 on which there are diametrically opposite high and low melting corresponding, respectively, to the limit of full retraction of the pistons into the motor unit cylinders and the limit of full extension of the pistons therefrom. Thus if the liquid flow into and out of the motor cylinders is at such a rate that the pistons 29 may be freely reciprocated in response to clockwise rotation, for instance, of the swash plate 9, no resultant rotational thrust will be imparted to the motor unit cylinder block 31. However if the relationship of the swash plates 9 and 20 is disturbed so that the suction strokes of the pump unit lag behind the corresponding retractive movements of the motor unit pistons 29 into their cylinders, the revolving swash plate 9 will impart a rotational thrust to the cylinder block 31 in proportion to the phase lag between the pump and motor units. Thus the motor block 31 and its connected power output shaft 4 will be rotated in a similar clockwise direction but at a rate which depends upon the dissimilarity of angular setting of the variably positionable swash plate 20 relative to the fixed swash plate 9. In any forward speed of the vehicle or apparatus with which the speed change mechanism may be associated this ratio of speeds between the power input and output shafts may be set within a range to provide for a single revolution of the output shaft relative to a very large number of revolutions of the input shaft or for unitary rotation of the input and output shafts.

The foregoing description dealt with forward speed ratios of the mechanism wherein full extension of the motor unit pistons would be reached on the rising surface of the swash plate 9 in returning the pistons 29 to their fully retracted positions. If the respective positions of the swash plates 9 and 20 are set so that the full extension of the piston 29 occurs on the descending face of the swash plate 9, from the high to the low points thereof, the ends of the pistons will be pressing against a face angle of the swash plate reverse to that occurring in the forward speed arrangement with the result a rotational thrust will be imparted to the motor unit cylinder block 31 which is counter-revolutionary to the direction of rotation of the swash plate 9. Thus depending upon the force and degree of extension of the pistons 29 various reverse speeds of the power output shaft 4 may be obtained.

Figure 1:
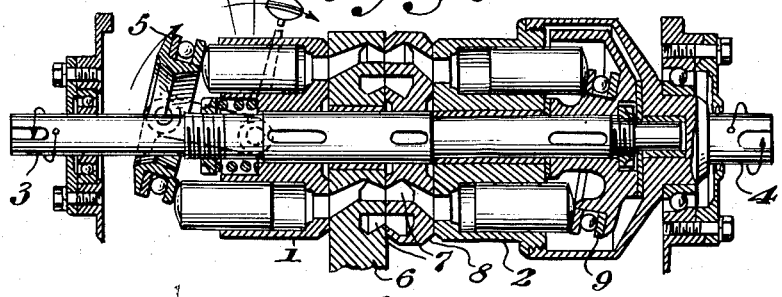
Figure 1 is a reduced scale vertical sectional view taken longitudinally of the transmission apparatus of my invention and illustrating the relative positions of the parts in providing a reverse drive between the input and output shafts.

Figure 1 shows the setting for obtaining reverse rotation of the output shaft 4 relative to the direction of rotation of the power input shaft 3 as explained above. Here due to the greater angularity of the variable swash plate 20 relative to the fixed swash plate 9 the displacement of pump unit 1 is shown as being greater than that of the constant capacity motor unit 2. The result is that liquid from the pump cylinders is admitted to the motor cylinders faster than the pistons 29 can be extended against the swash plate which causes the cylinder block 31 to be forced to rotate counted to the rotational direction of the power input shaft.

Figure 2 shows neutral position described previously, which obtains when the displacement of pump unit 1 is caused to coincide with that of the constant capacity motor unit 2 by equalizing the angular settings of the respective swash plates. Pump unit 1 is thus supplying liquid in volume only to equal the displacement of the pistons 29, as the latter freely move in their cylinders, which results in no torque being generated in the power output shaft.

Figure 3:
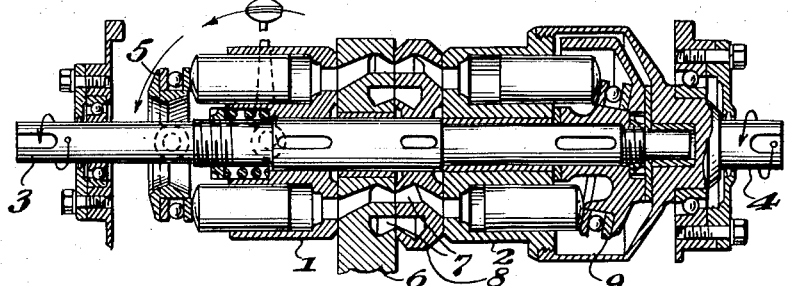
Figure 3 is a view similar to Figure 1 showing the positions of the parts in effecting unitary rotation of the shafts.

Figures 3 and 8 show a ratio selection of unity which occurs when the output of pump unit 1 is zero, thereby locking the pistons 17 and 29 against reciprocating movement and causing the fluid to cease flowing between the pump and motor units, which effects rotation of the cylinder block 31, housing 37, and drive shaft 4 at the same speed of rotation as that of the power input shaft 3 and in the same direction.

Figure 4:
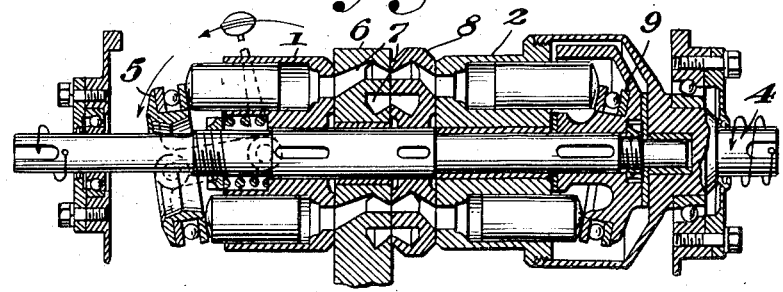
Figure 4 is a view similar to Figure 1 showing the positions of the parts in providing for overdriving of the output shaft relative to the input shaft.

Figure 4 shows the overdrive position, which occurs when the output of pump unit 1 is increased in opposite phase to that used in reverse, stop, or low selections by movement of the variable swash plate to a plane which is oppositely angular to that occupied by the fixed swash plate 9. This reverses the flow of the liquid to that existing between pump unit 1 and motor unit 2 in the aforementioned drive rations and thus causes crowding of the cylinder block 31 ahead of the rotating swash plate 9 and consequently revolves the drive shaft 4 faster than the rotational speed of the power shaft 3.

The pistons 17, herein shown as seven in number, are arranged circumferentially around the axis of the shaft 3 and are provided with return springs 18 for priming purposes and for taking up mechanical wear. The pressure flow of liquid from one cylinder acts, on the return stroke of an associated cylinder, to assist in the latter's recharge. The pump pistons 17, have a domed end of the same radius as the circumferentially concavedly grooved face of the variable swash plate bearing to provide for maximum contact area on the piston ends and to assure longer life of the bearing face.

The variable swash plate assembly 5 is hinged on two pins 21, the latter being fixed to the stationary outer casing 43. The variable swash plate assembly is actuated by the power assist control piston 10, best shown in Figures 5, 6 and 7, while the transmission is under power and can be easily operated manually while the vehicle stopped, or not, in load transmitting condition. The hydraulicly balanced control valve 11, regulates the amount of hydraulic liquid drawn from the pressure system of the mechanism which is supplied by pressure strokes of the pumping unit, to provide the variable swash plate setting desired, through channels 22 entering opposite ends of the cylinder in which the position 10 operates. Control valve 11 closes channels 22 as shown in Figure 5 after a desired angular setting of the variable swash plate 20 has been secured which in turn locks the liquid in the power assist control cylinder and locks the position of the desired ratio setting of the transmission. Suitable linkage as shown, is used to move the control valve and consequently the piston, a manually operable control lever, shown in Figures 5 through 7, being connected to the linkage, the operative positions of the former as indicated in the said figures lying within the continuous stroke of movement required in the entire range of speed settings.

Figure 12:
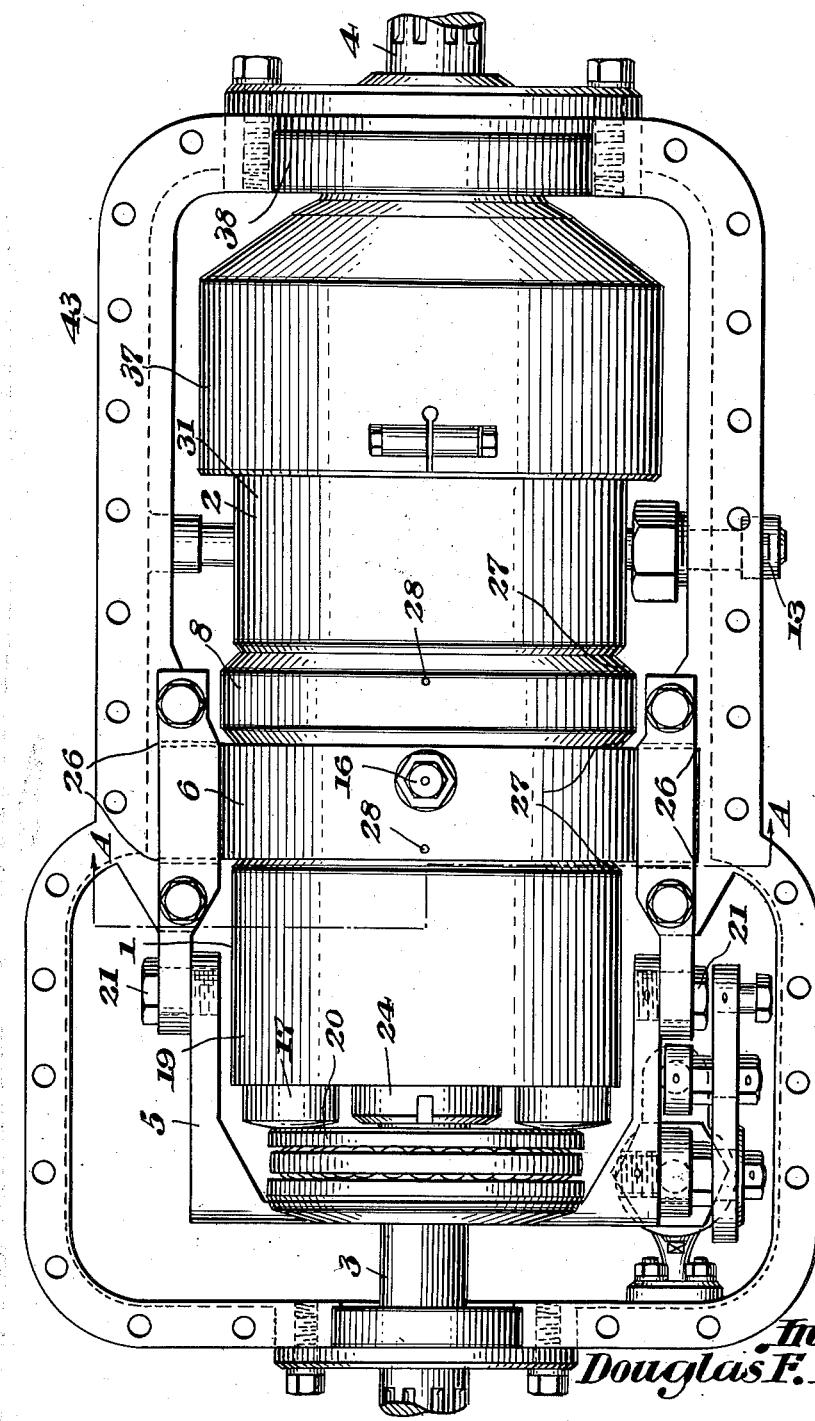
Figure 12 is a top plan view of the variable speed transmission of my invention, the upper portion of the casing being removed so as to more clearly disclose the internal construction and arrangement of the parts.

A shock and take-up spring 23 is located on the power shaft 3, the tension thereof being adjustable by nut 24 so as to provide for yieldable separation between the cylinder blocks 6 and 19 and function as a safety valve relief in sudden hydraulic jolts or pressures occasioned by severe torque conditions in access of safety factor. The spring 23 also takes up any wear in the faces between the cylinder blocks and maintains the seal between the former blocks and the members 6 and 8 fluid-tight. The thrust of the spring 23 is transmitted to the end of power shaft 3 by a nut 25 bearing against the fixed swash plate 9. The other end of the take up spring 23 rests against the cylinder block 19 of the pump unit 1. Splines or key ways of cylinder block 19, and of the block 8, are of slip fit variety to allow for relative movement between the blocks. Stationary valve block 6 is also movable axially of the shafts to compensate for pressure shocks by means of the slidable engagement thereof in the guide structure indicated at position 26 in Figure 12. Substantial uniformity of contact area between the blocks 31, 6, 8 and 19 is accomplished by providing chamfered peripheral edges at positions 27; and drain channels 28 are provided for venting into the liquid reservoir casing 43 any slight leakage which may occur into the peripheral space about the shaft 3.

The motor 2 as aforesaid is of a constant capacity type with its plurality of pistons 29, seven in number in this case, provided with return stroke springs 30. The cylinder block 31, is carried on suitable bearing 32, and revolves on power shaft 3 in stop, reverse and overdrive speeds, but is relatively stationary on the power shaft while the transmission is in high ratio speed. The same rotation relationships occur in the case of the pilot bearing 33 and thrust washers 34 and 35 which centralize the fixed swash plate 9 with the bell housing 37.

The swash plate 9 is statically balanced by a counterweight 36 formed integrally therewith. Rotation of the swash plate 9 is transmitted through cylinder block 31 to the bell housing 37 which is carried on a combined radial and thrust bearing 38 mounted in the outer casing 43 of the mechanism and delivers torque to the output shaft.

The valve head 6 carries a centering bearing 40 which acts as a lubricant collector for the lubrication of the radial and thrust bearings 32, 33, 34, and 35 through lubricating channel 14 drilled axially of the shaft 3. The valve head 6 also has an integral downwardly extending portion thereof immersed in the supply of liquid which fills the lower portion of the casing 43, the said extension having axially vertical passages 41 therein communicating at their upper ends with the chambers 7 and fitted at their lower ends with ball check valves 15. The extension of the valve head also has therein an axially horizontal passage which communicates at its ends with the passages 41 and which carries a slidable two way check valve 12, best shown in Figures 10 and 11, which acts in opposite directions as the flow of fluid entering from either of the passages 41 under pressure moves it. In all normal forward drive ratios of the transmission up to unity rotation between the shafts 3 and 4, the check valve 12 occupies the position in which it is shown in Figure 9 being forced into this position by the pressure of liquid entering from the left hand passage 41 which is normally connected with the discharge chamber of the pump unit. Overdrive position illustrated in Figure 11 reverses the flow from pump unit 1 and the check valve 12 is therefore moved to the opposite end of its enclosing passage. Lock control 13, which comprises a conically pointed plunger capable of entering a correspondingly shaped recess formed in the side of the check valve when applied, centers the check valve 12 in the position indicated in Figure 10. The plunger 13 is connected with a suitable link and lever actuating means which may be manually controlled from exteriorly of the casing 43 by suitable lever mechanism or the like. This allows the fluid to flow from the intake to the discharge openings 39, and through channels 41, resulting in a free wheeling arrangement for disengagement of the fluid coupling between the pump and motor units.

The two intake or priming check valves 15 for supplying the system with liquid from the sump in the lower section of the casing 43, are provided so that one valve functions while flow is in one direction and the other operates for the reverse of flow in overdrive as before explained. The valve head 6 also carries a passage 14 to supply liquid under pressure for the lubricating system and power assist control supply line 42. The valve head 6 also carries a ball check vent or automatic bleeder valve 16, Figure 8, which allows entrapped air to escape while priming the liquid flow system, but closes upon contact with liquid under pressure and by gravity while the transmission mechanism is inactive to retain an adequate amount of liquid in the system.

The unit as a whole is contained in the case 43 which is divided horizontally in the plane of the shaft center line to facilitate assembly of the torque transmission and speed change apparatus.

I claim:

1. In a pump and motor hydraulic transmission comprising rotatable separate power input and output shafts, a multi-cylinder variable capacity pump unit connected for rotation with said input shaft, a multi-cylinder fixed capacity motor unit operatively disposed between said input and output shafts and having relatively confronting ports through which liquid may be transferred between the pump and motor units in accordance with variations in the capacity of said pump unit, said pump unit including a variably positionable swash plate operative therewith and said motor including a relatively fixed swash plate operative therewith and with said power output shaft, said variably positionable swash plate controlling the volume of successive admissions and discharges of liquid to and from its associated pump unit during rotation of the power input shaft and said relatively fixed swash plate governing relative rotation of said power output shaft relative to said power input shaft in proportion to transfer of liquid between the pump and motor units, a fixed valve head having separate passages therein arranged to communicate with separate ports of the pump unit during rotation of the latter, a valve block carried by and rotatable with the input shaft and provided with passages complementary with the passages of the valve head and arranged to communicate with the separate ports of the motor unit during rotation of the latter and of the input shaft, said valve head having ducts therein through which liquid may flow between the passages of said valve head, said valve head having a slidable valve therein operable by the flow of liquid to control the flow of liquid in said ducts, means including a manually operated plunger member for rendering said slidable valve inoperative whereby fluid coupling between the pump and motor units is disengaged and control means interposed between said variably positionable swash plate and said pump unit for varying the position of said variably positionable swash plate whereby the phases of admissions and discharges of liquid to and from said pump and motor units may be adjustably varied.

2. In a pump and motor hydraulic transmission comprising rotatable separate power input and output shafts, a multi-cylinder variable capacity pump unit connected for rotation with said input shaft, a multi-cylinder fixed capacity motor unit operatively disposed between said input and output shafts and having a pressure responsive element connected with and to rotate said output shaft, said pump and motor units having relatively confronting ports through which liquid may be transferred between the pump and motor units in accordance with variations in the capacity of said pump unit, a fixed valve head having separate passages therein arranged to communicate with ports of the pump unit during rotation of the latter, a valve block carried by and rotatable with the input shaft and provided with separate passages complementary with the passages of the valve head and arranged to communicate with the ports of the motor unit during rotation of the latter and of the input shaft, said valve head having therein ducts through which liquid flows between the separate passages of said valve head, valve means in said ducts operable by the flow of liquid to control said flow, and means for locking said valve means in inoperative position whereby fluid coupling between the pump and motor units is disengaged.

3. In a pump and motor hydraulic transmission comprising rotatable separate power input and output shafts, a multi-cylinder variable capacity pump unit connected for rotation with said input shaft, a multi-cylinder fixed capacity motor unit operatively disposed between said input and output shafts and having a pressure responsive element connected with and to rotate said output shaft, said pump and motor units having relatively confronting ports through which liquid may be transferred between the pump and motor units in accordance with variations in the capacity of said pump unit, a fixed valve head having separate passages therein arranged to communicate with ports of the pump unit during rotation of the latter, a valve block carried by and rotatable with the input shaft and provided with separate passages complementary with the passages of the valve head and arranged to communicate with the ports of the motor unit during rotation of the latter and of the input shaft, said valve head having therein ducts through which liquid flows between the separate passages of said valve head, valve means in said ducts operable by the flow of liquid to control said flow, and means for locking said valve means in inoperative position whereby fluid coupling between the pump and motor units is disengaged, said locking means including a plunger member engageable with said valve means and actuated by manually operated link and lever means, and an automatically operated valve carried by said valve head for bleeding out air from the liquid.

DOUGLAS FITCH FROEBE.

REFERENCES CITED

The following references are of record in the file of this patent:

UNITED STATES PATENTS

| Number | Name | Date |
|---|---|---|
| 2,114,076 | Gölz | Apr. 12, 1938 |
| 2,404,668 | Thompson | July 23, 1946 |

FOREIGN PATENTS

| Number | Country | Date |
|---|---|---|
| 508,434 | France | July 24, 1920 |
| 208,591 | Great Britain | Dec. 19, 1923 |